(No Model.)
J. USBORNE.
FIRE ESCAPE.
No. 293,689. Patented Feb. 19, 1884.
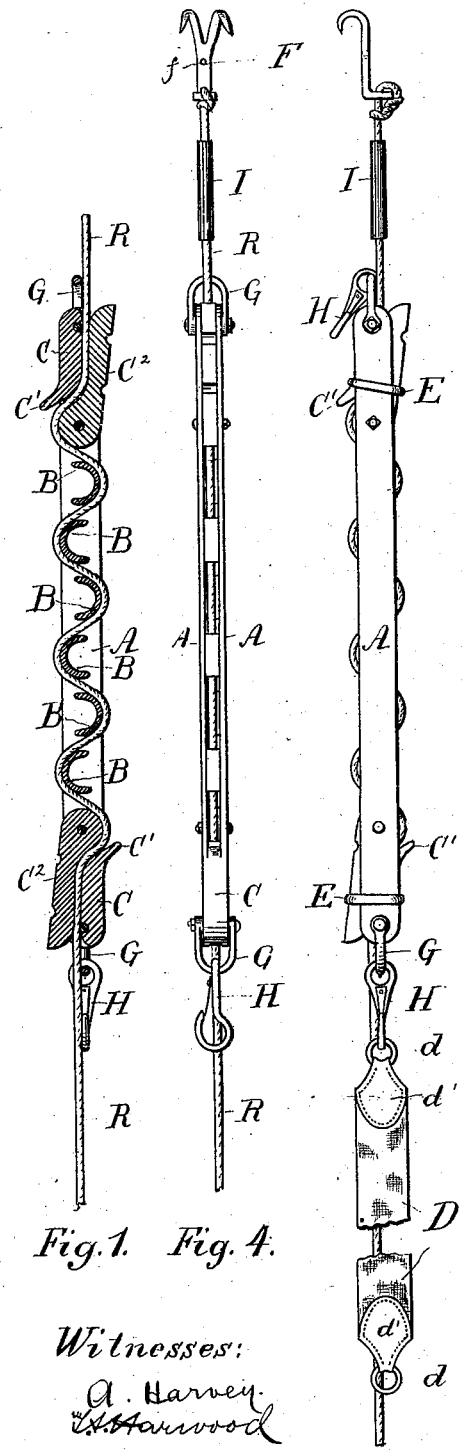
Fig. 1.   Fig. 4.
Witnesses:
A. Harvey
T. H. Harwood
Fig. 3.
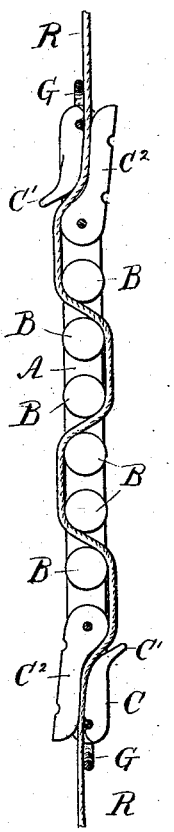
Fig. 2.
Fig. 5.
Inventor
John Usborne
By J. Hourrolle
Atty

UNITED STATES PATENT OFFICE.

JOHN USBORNE, OF ARNPRIOR, ONTARIO, CANADA.

FIRE-ESCAPE.

SPECIFICATION forming part of Letters Patent No. 293,689, dated February 19, 1884.

Application filed May 17, 1883. (No model.)

*To all whom it may concern:*

Be it known that I, JOHN USBORNE, of Arnprior, in the Province of Ontario, Canada, have invented a new and useful Fire-Escape; and I do hereby declare the following to be a full, clear, and exact description of the same.

My invention relates to appliances by means of which persons may descend with safety from an elevated position down a rope, which may be easily secured at the place of descent, the appliance being of the most simple construction, and provided with means of regulating the velocity of the descent.

Figure 1 is a longitudinal section of my improved appliance. Fig. 2 shows a modification of the blocks and means of threading the same. Fig. 3 is a side view of the appliance. Fig. 4 is an edge view. Fig. 5 is a view of the appliance as applied and used by a person descending from the window-sill of an upper story.

A A are the two side straps or bars, and B are the stationary guides or blocks. The sides A and blocks or guides B may be cast in one piece, or may be formed by riveting or bolting the sides together. The blocks B may be circular or elliptic, or may only form part circles or part ellipses, the object being to provide sufficient bearing or friction surface, which should not be angular, to avoid injury to the rope.

C is a stationary brake-block, provided with a finger-guard, C'.

$C^2$ is another brake-block pivoted between the sides, its head forming one of the friction-blocks. A spring may be employed to maintain any desired permanent pressure upon the pivoted brake-block; but I prefer to put a strong elastic band, E, upon it, and by placing the same nearer to or farther from the pivot in notches provided for that purpose the brake-power will be decreased or increased accordingly.

G G are shackles, one of which is pivoted to each end of the bar, and H is a spring-hook, of ordinary description, linked into the said shackle. Instead of the pivoted shackle, however, a simple eye may be formed in the ends of the sides A.

D is a band or strap, to the ends of which the rings $d$ are firmly secured by lashes $d'$.

R is a light but strong rope, threaded between the friction-blocks B and brakes C $C^2$; and F is a grab-hook secured to the end of the rope nearest the bar A. The shank of the hook F is provided with a hole, $f$, through which a nail or screw may be driven to firmly secure the hook.

I is a piece of rubber tubing or similar article, slipped on the rope, and placed so as to prevent the latter from being injured by any sharp corners over which the rope may be laid.

It may be observed that by increasing or decreasing the number of friction-blocks B my escape may be proportioned to the weight of a person desiring to use it, and for that purpose the bars may be graduated at so many pounds to each block B, subject to a specified diameter and quality of rope. The friction may also be decreased by unthreading the rope from some of the blocks B; or, in appliance having blocks forming a complete circle or ellipse, the rope may be rethreaded hit and miss, as shown in Fig. 2.

It may further be remarked that an appliance of this nature, being very light and occupying but little space, may be carried by a traveler in his baggage, and being kept in his bedroom would always be ready for use in emergency, and could be instantly applied by securing the grab-hook to the window-sill, placing the band around the waist, and slipping the rings in the spring-hook. The person wishing to descend would then suspend himself and regulate the speed of descent by pressing the brake with the hand. It is also found that, should a person omit to use the brake or descend too rapidly for some other reason, a pull on the rope below will slacken the velocity or stop the descent altogether.

I prefer to make the appliance double-ended, in order that two or more descents may be made without unthreading the rope. Another person desiring to descend would only draw up the rope and secure the end to the grab-hook after having detached the other end. The bar A, being then near the now upper end of the rope, would, although reversed, be ready for action again; and this could be repeated again and again without unthreading the rope, as would be necessary if the appliance were only single-ended.

I am aware that frames provided with bars or friction devices between which a rope is passed in serpentine form are old in fire-escapes, and I am also aware that fire-escapes have been provided with brakes or friction devices of various kinds adapted to be controlled by the user, and to such constructions I lay no broad claim.

I claim as my invention—

1. In a reversible fire-escape, the sliding arm or guide provided with friction-blocks B, and also provided at one of its two ends with a suspension device, H, and a friction-brake, C″, the latter with an actuating-spring, and also adapted to be operated by hand, as described, whereby the attendant is enabled to grasp and operate either brake, the other being automatically actuated at the same time by means of its springs.

2. In a fire-escape, the frame or body provided with the fixed friction-surfaces B and C′, the two pivoted brakes C″, and springs applied to actuate said brakes, whereby the action of both brakes is secured automatically independently of the control of the operator.

3. In a fire-escape, the combination, with the frame having the stationary friction-surface C′, of the pivoted brake C″, and the elastic encircling band E, the parts being provided as described with a series of notches to admit of the band being secured in different positions.

4. The combination of elastic bands E with the bar and the brake-blocks C C², all substantially as described, and for the purpose set forth.

Signed at Ottawa this 28th day of April, 1883.

JOHN USBORNE.

In presence of—
T. A. HARWOOD.
R. KING.